United States Patent
Letendre

(10) Patent No.: US 10,871,826 B2
(45) Date of Patent: Dec. 22, 2020

(54) HAPTIC FEEDBACK REMOTE CONTROL SYSTEMS AND METHODS

(71) Applicant: EchoStar Technologies L.L.C., Englewood, CO (US)

(72) Inventor: Ellen Letendre, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 441 days.

(21) Appl. No.: 15/057,933

(22) Filed: Mar. 1, 2016

(65) Prior Publication Data
US 2017/0255263 A1 Sep. 7, 2017

(51) Int. Cl.
G06F 3/01 (2006.01)
H04N 21/422 (2011.01)
H04N 21/47 (2011.01)

(52) U.S. Cl.
CPC ....... G06F 3/016 (2013.01); H04N 21/42204 (2013.01); H04N 21/42222 (2013.01); H04N 21/47 (2013.01)

(58) Field of Classification Search
CPC ................ G06F 3/016; H04N 21/4222; H04N 21/42219; H04N 21/42204
See application file for complete search history.

(56) References Cited

U.S. PATENT DOCUMENTS

| | | | |
|---|---|---|---|
| 2015/0070151 A1* | 3/2015 | Cruz-Hernandez | ......................... G11B 27/031 340/407.1 |
| 2015/0249672 A1 | 9/2015 | Burns et al. | |
| 2016/0004309 A1* | 1/2016 | Modarres | ................ G06F 3/016 345/173 |
| 2016/0054799 A1* | 2/2016 | Levesque | ................ G06F 3/041 345/173 |
| 2016/0132114 A1* | 5/2016 | Rihn | ...................... G06F 3/016 345/156 |
| 2016/0135695 A1* | 5/2016 | Cobbett | ............... A61B 5/0205 600/301 |
| 2016/0147333 A1* | 5/2016 | Levesque | .............. G06F 3/0487 345/161 |
| 2017/0053469 A1 | 2/2017 | Cheng et al. | |

* cited by examiner

*Primary Examiner* — Lixi C Simpson
(74) *Attorney, Agent, or Firm* — Seed IP Law Group LLP

(57) ABSTRACT

Haptic feedback remote control systems and methods are provided. A method for providing haptic feedback to a user of a haptic feedback remote control device includes receiving, by a receiving device, an electronic command issued from the haptic feedback remote control device. The receiving device transmits a haptic feedback command to the haptic feedback remote control device. Based on the received haptic feedback command, the haptic feedback remote control activates a haptic feedback device, within the haptic feedback remote control, to provide a haptic feedback effect to a user of the haptic feedback remote control device.

17 Claims, 4 Drawing Sheets

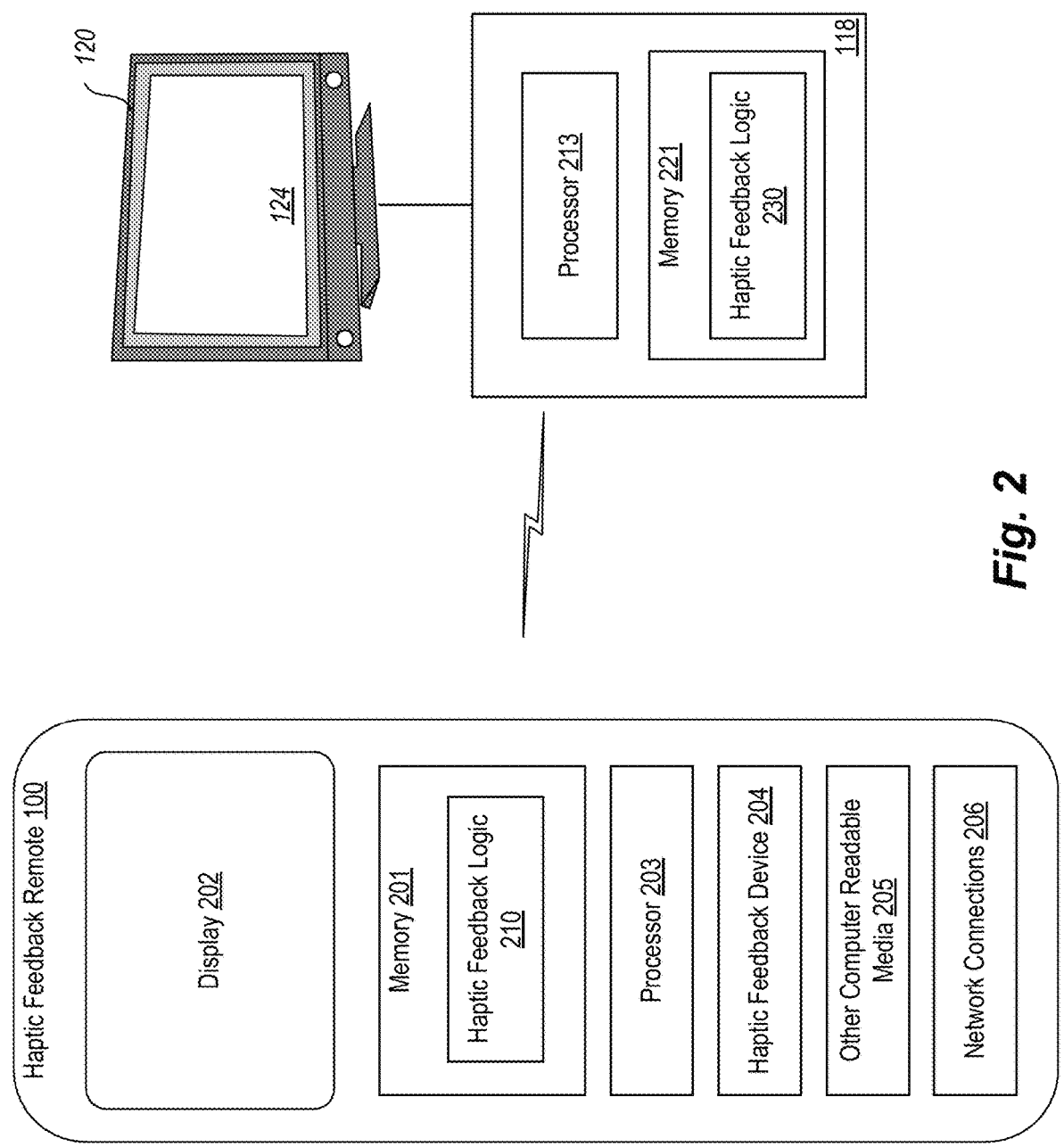

| dish Guide | | | | Showing All Subscribed | Tue 11/25 6:18p |
|---|---|---|---|---|---|
| Tue 11/25 | 6:00p | 6:30p | 7:00p | 7:30p | |
| 110 FOOD | Chopped | Chopped | Cake Wars | Paula's Home | Avatar |
| 109 LMN | Avatar | | Intervention | | Movie 2009 ★★★☆ |
| 108 Life | UnReal | Frasier | Grey's Anatomy | | 4:45 – 7:00 |
| 107 CMDY | Comedy Central - On Demand | | | | A paraplegic Marine dispatched to the moon Pandora on a unique mission becomes torn… |
| 106 CMDY | Futurama | Futurama | Futurama | Tosh.0 | |
| 105 TVLND | Gunsmoke | Bonanza | The Execs | Impastor | HD |
| GAME FINDER | | | | Press ▶ to launch app PLAY | TV |

*Fig. 3*

HAPTIC FEEDBACK REMOTE CONTROL SYSTEMS AND METHODS

BACKGROUND

Technical Field

This disclosure generally relates to haptic feedback remote control systems and methods and, more particularly, to systems and methods for indicating a message or condition to a user through the use of haptic feedback effects.

Description of the Related Art

Remote control devices are often provided with a wide variety of electronic devices, such as televisions, audio receivers, DVD players and the like, in order to remotely control the operation of the associated electronic device. In the case of cable, satellite, or Over-the-Top (OTT) television, a set top box or other receiving device is often included which provides programming for display on a connected television or other display device. A user may control the set top box by use of an associated remote control device. Such control may include, for example, selecting a program to be displayed on the television, changing configurable settings for the set top box or connected devices, controlling DVR or audio content, and so on.

While conventional remote control devices may be suitable for a large portion of cable, satellite, and OTT television viewers, for others, remote control devices may be confusing, difficult to use or otherwise insufficient to suitably interact with an associated set top box or television display. Use of conventional remote control devices may be particularly challenging for persons with limited or low vision, limited or no hearing, or some combination of limited vision and hearing.

BRIEF SUMMARY

The present disclosure provides systems, methods and devices that ameliorate the problems associated with conventional remote control devices. In particular, haptic feedback may be used to provide, via a user's sense of touch, indications or messages about the user's interaction with a set top box or other receiving device. For example, if a user inputs a command on a haptic feedback remote control that cannot be performed by the set top box, the remote control may provide haptic feedback that indicates the command cannot be performed. This is particularly helpful for users having low or limited vision and/or low or limited hearing. The use of haptic feedback enhances and facilitates better, and more useful, interaction with a set top box, as the user may receive information relating to the interaction via the sense of touch. A variety of types of haptic feedback effects may be utilized by the haptic feedback remote control, and each type of haptic feedback effects may be associated with different conditions or messages to be conveyed to the user.

In one embodiment, a method for providing haptic feedback to a user of a haptic feedback remote control device is provided. The method includes: receiving, by a receiving device, an electronic command issued from the haptic feedback remote control device; transmitting, by the receiving device, a haptic feedback command to the haptic feedback remote control device; and activating a haptic feedback device within the haptic feedback remote control device, based on the haptic feedback command, to provide a haptic feedback effect to a user of the haptic feedback remote control device.

In another embodiment, a haptic feedback system is provided that includes a receiving device and a haptic feedback remote control device. The haptic feedback remote control device includes a haptic feedback device, and the haptic feedback remote control device is configured to: transmit an electronic command to the receiving device, receive a haptic feedback command from the receiving device, and activate, based on the received haptic feedback command, the haptic feedback device to provide a haptic feedback effect to a user of the haptic feedback remote control device.

In yet another embodiment, a haptic feedback remote control device is provided that includes haptic feedback logic, a haptic feedback device and a processor coupled to the haptic feedback logic and the haptic feedback device. The haptic feedback remote control device is configured to: transmit an electronic command to a receiving device, receive a haptic feedback command from the receiving device, and activate, based on the received haptic feedback command, the haptic feedback device to provide a haptic feedback effect to a user of the haptic feedback remote control device.

In another embodiment, a haptic feedback system is provided that includes a set top box, a haptic feedback remote control device, and haptic feedback means, coupled with the haptic feedback remote control device, for providing a haptic feedback effect to a user of the haptic feedback remote control device, based on a haptic feedback command received from the set top box.

BRIEF DESCRIPTION OF THE SEVERAL VIEWS OF THE DRAWINGS

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility.

FIG. 2 is a block diagram illustrating further details of the haptic feedback remote control device and the receiving device, in accordance with one or more embodiments.

FIG. 3 illustrates an example receiving device user interface which may be utilized in connection with the haptic feedback system, in one or more embodiments.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example, "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
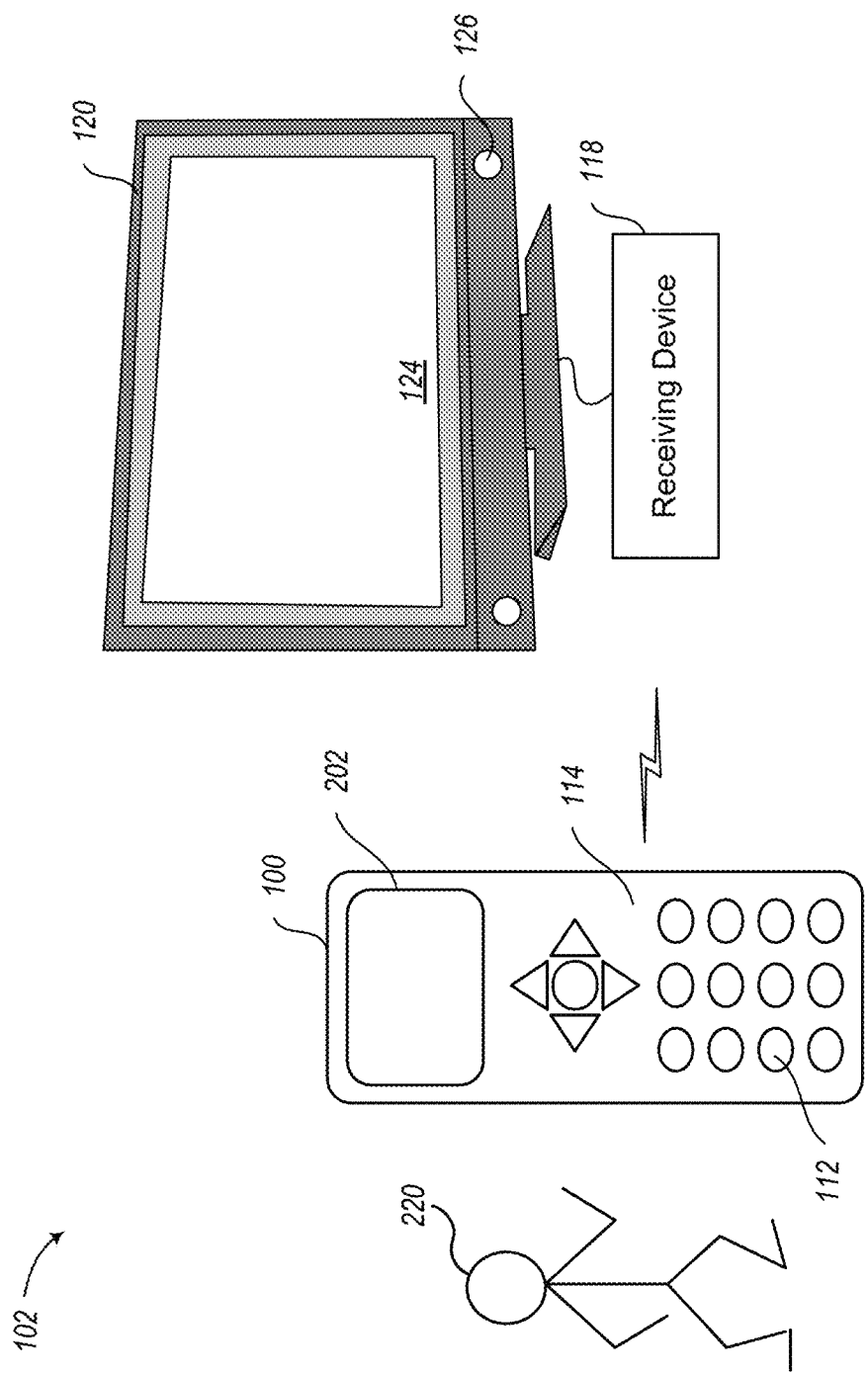
FIG. 1 is a block diagram illustrating an example haptic feedback system in which embodiments of a haptic feedback remote control device may be implemented.

FIG. 1 is a block diagram illustrating an example haptic feedback system 102 in which embodiments of a haptic feedback remote control device ("haptic feedback remote") 100 may be implemented. It is to be appreciated that FIG. 1 illustrates just one example of a haptic feedback system 102 and that the various embodiments discussed herein are not limited to such systems. The haptic feedback system 102 includes the haptic feedback remote 100, a receiving device 118 and a presentation device 120.

The receiving device 118 receives programming (e.g., from audio, video, and/or data service providers, such as, but not limited to, television service providers) and provides the content to a presentation device 120 for viewing by one or more users 220.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of communications media or sources. Based upon selection by the user, the receiving device 118 processes and communicates the selected programming to one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Additionally, the receiving device 118 may be an application, including any combination of software and/or hardware, such as a client application with a video/audio player. For example, the receiving device 118 may be an application in, or accessible by, a smartTV, internet TV, or the like. Further, the receiving device 118 may itself include user interface devices, such as buttons or switches.

Examples of a presentation device 120 include, but are not limited to, a television ("TV"), a personal computer ("PC"), a sound system receiver, a digital video recorder ("DVR"), a compact disk ("CD") device, game system, mobile device, or the like. Presentation devices 120 include a display 124, one or more speakers 126, and/or other output devices to communicate video and/or audio content to a user. In some implementations, one or more presentation devices 120 may reside in or near a customer's premises and may be communicatively coupled, directly or indirectly, to the receiving device 118. Indirect communicative coupling may be accomplished through any wireless communication network or protocol, including, for example, Bluetooth, ZigBee, Z-Wave, Wi-Fi or the like. Further, the receiving device 118 and the presentation device 120 may be integrated into a single device. Such a single device may have the functionality of the receiving device 118 and the presentation device 120, described herein, or may even have additional functionality.

Interface between the receiving device 118 and a user 220 may be provided by the haptic feedback remote 100. Haptic feedback remote 100 may communicate with the receiving device 118 using any suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The haptic feedback remote 100 may be or include many possible physical forms and/or features, including for example, a dongle worn on a lanyard or any other wearable device through which haptic feedback can be felt by a user, in addition to a traditional handheld remote.

In the illustrated example, the haptic feedback remote 100 includes an optional display 202 and a user interface 114 including a plurality of user input elements, such as buttons 112. The user interface 114 is configured to receive user input for transmitting commands to the receiving device 118. In one example, the user interface 114 includes multiple keys or buttons 112 that the user 220 may press to initiate the commands. Such buttons 112 may include numeric buttons for inputting program channel numbers and other information, directional buttons (e.g., "up," "down," "left" and "right") for menu item selection and other functions, and other special-purpose buttons (e.g., "volume up," "channel down," "pause," "rewind," "input" and so on). In another example, the user interface 114 may include a touchpad, a mouse, a joystick, a free-space position-sensing system, such as a gyroscope or accelerometer, or similar positioning device to allow a user 220 to move a cursor or other indicator on a display, such as the presentation device 120. The buttons 112 provided on the haptic feedback remote 100 may be physical keys or buttons, or may be any other user input elements, such as graphically displayed icons which may be selected utilizing a touch screen, mouse, or the like. Further, the haptic feedback remote 100 may include a microphone for receiving user input in the form of voice commands.

The haptic feedback remote 100 may further include various "accessibility" features for ease of use by people, for example, having low vision and/or limited or no hearing. Such accessibility features may include indents or nodules included on buttons 112 for identifying the buttons 112 by feel. Further, the haptic feedback remote 100 may include a haptic feedback enable/disable element (which may be, for example, a button 112, a sliding toggle, touch tap or any other such user interface element) which puts the haptic feedback remote 100 into a haptic feedback mode. That is, the haptic feedback remote 100 may operate in a "normal" or non-haptic feedback mode, or alternatively, the haptic feedback remote 100 may be put into a haptic feedback mode through use of a haptic feedback mode button 112.

Additionally, the haptic feedback remote 100 may be put into a haptic feedback mode automatically under certain conditions. For example, if the receiving device 118 receives user input from the haptic feedback remote 100 which indicate user confusion (e.g., multiple invalid commands, or the like), then the receiving device 118 may cause the haptic feedback remote 100 to automatically enter the haptic feedback mode, in which case haptic feedback may be provided to the user via the haptic feedback remote 100.

FIG. 2 is a block diagram illustrating further details of the haptic feedback remote control device 100 and the receiving device 118, in accordance with one or more embodiments. It should be noted that the components of the illustrated haptic feedback remote 100 and the receiving device 118 may be implemented in software, hardware, firmware, or in some combination to achieve the capabilities described herein.

In the embodiment shown, haptic feedback remote 100 includes a computer-readable memory ("memory") 201, one or more processors 203 and one or more haptic feedback devices 204. The haptic feedback remote 100 may further include other computer-readable media 205 (e.g., flash memory, SIM card), network connections 206 and a display 202. The display 202 may be, for example, a bit-mapped LCD display having sufficient resolution to display multiple lines of text and/or other user interface elements. The network connections 206 may include one or more communication interfaces to various media devices, including but not limited to radio frequency transceivers, infrared transceivers, Bluetooth (BT), ZigBee, Z-Wave, wireless Ethernet ("Wi-Fi") interfaces, and the like.

The haptic feedback remote 100 communicates with receiving device 118, and may further communicate with the presentation device 120, either directly or indirectly, for example, through the receiving device 118.

Haptic feedback logic 210 may reside in memory 201. In other embodiments, some portion of the contents, some of or all of the components of the logic 210 may be stored on and/or transmitted over the other computer-readable media 205. The logic 210 preferably executes on one or more processors 203 and manages the provision of haptic feedback by the haptic feedback remote 100, as described herein. Other code or programs and potentially other data/information (not shown), may also reside in the memory 201, and preferably execute on one or more processors 203. Of note, one or more of the components in FIG. 2 may not be present in any specific implementation. For example, some embodiments may not provide other computer readable media 205. Further, the haptic feedback logic 210 may be absent from the haptic feedback remote 100, with haptic feedback management being handled instead through haptic feedback logic 230 provided in the receiving device 118. In such a case, the determination of whether to provide haptic feedback may be made by the haptic feedback logic 230 of the receiving device 118, which in turn may send a command to the haptic feedback remote 100 to provide haptic feedback (i.e., through the haptic feedback device 204) to the user 220.

The haptic feedback logic 210 performs the haptic feedback functions of the haptic feedback remote 100, as described in further detail below. In particular, the haptic feedback logic 210 determines whether haptic feedback should be provided to a user 220 of the haptic feedback remote 100, and the particular haptic feedback effect to be provided (e.g., quantity, strength or intensity, duration, speed, rhythm of haptic feedback). The haptic feedback logic 210 is accessible by the processor 203, and the processor 203, upon determining a haptic feedback effect to be provided to the user 220, controls the haptic feedback device 204 to provide the determined haptic feedback effect.

In one or more embodiments, the haptic feedback logic 230 stored in the memory 221 of the receiving device 118 may perform the haptic feedback functions described herein. For example, based on user inputs (e.g., button pushes) to the haptic feedback remote 100, received by the receiving device 118, the receiving device 118 may determine (e.g., by the processor 213 in communication with the haptic feedback logic 230) that a haptic feedback effect of a particular type should be provided to the user 220 of the haptic feedback remote 100. The receiving device 118 may thus transmit a haptic feedback command signal to the haptic feedback remote 100, instructing the haptic feedback remote 100 to provide the determined haptic feedback effect (e.g., via the haptic feedback device 204) to the user 220.

In some embodiments, some or all of the components/portions of the haptic feedback logic 210, 230 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The haptic feedback device 204 may be any device operable to provide a haptic feedback effect (such as, for example, a vibration effect) to a user 220 of the haptic feedback remote 100. That is, the haptic feedback device 204 may be any device which provides forces, vibrations or motions to the haptic feedback remote 100 that can be sensed by a user 220 (e.g., as tactile haptic feedback). In one embodiment, the haptic feedback device 204 includes a vibration element, which provides vibrational haptic feedback effects. The haptic feedback effects may be provided generally to the haptic feedback remote 100, or may be provided specifically at particular portions of the haptic feedback remote 100. For example, a plurality of haptic feedback devices 204 may be included in the haptic feedback remote 100, with each of the haptic feedback devices 204 being operable to provide haptic feedback effects to a particular portion of the haptic feedback remote 100 (e.g., vibrations provided to particular buttons 112; vibrations provided to particular areas (e.g., top, bottom, left, right) of the haptic feedback remote 100).

The features of the haptic feedback remote 100 can be combined with other accessibility features, such as textual bumps or nodules on the buttons 112, audio features for providing audible feedback to a user (e.g., an audible tone or buzz), visual feedback indicators (e.g., blinking lights) or the like.

FIG. 3 illustrates an example receiving device user interface 302 which may be utilized in connection with the haptic feedback system 102, in one or more embodiments. The receiving device 118 may be, for example, a set-top box that provides the user interface 302 for display on the presentation device 120. The receiving device user interface 302 may include any conventional features commonly found in set-top boxes (e.g., for satellite or cable television systems), including, for example, program guides or menus, settings screens, help menus, on-demand programming access, DVR capabilities, and the like. As shown in FIG. 3, the user interface 302 may include a program guide screen that includes a schedule of programming, listed by titles and time of broadcast. A user may interact with the user interface 302 through use of the haptic feedback remote 100. For example, a user may scroll through the various programming channels, times of broadcast and the like through use of the haptic feedback remote 100. It should be readily appreciated that the user interface 302 may include a variety of menus, sub-menus, pop-up message windows or boxes, or the like, and further may at times display messages to a user which may require some interaction or input on the part of the user (e.g., "Are you sure you want to delete this recorded program? Please select 'Yes' or 'No'").

In one or more embodiments, the user interface 302 may include a help or tutorial feature, which may include video and audio (e.g., provided via the presentation device 120) explaining how to use the haptic feedback, what different types of haptic feedback indicate, and so on. The haptic feedback help or tutorial feature may be launched by navigating to a help menu via the user interface 302, or alternatively, the help or tutorial feature may be automatically launched, and displayed on the presentation device 120, if the receiving device 118 detects that the user is having trouble using the haptic feedback remote 100 (e.g., multiple invalid inputs, or the like). Additionally, the haptic feedback help or tutorial feature may be launched by via a 'haptic feedback help' user input element, such as a button 112.

Haptic feedback effects may be provided by the haptic feedback remote 100 to indicate a variety of conditions. For example, in some embodiments, haptic feedback effects may be provided to indicate that the user has navigated to or reached a limiting edge of the receiving device user interface 302 (e.g., top, bottom, and side edges of the user interface 302) and that further commands received from the haptic feedback remote 100 (e.g., by pressing "up," "down," "left" or "right" on the haptic feedback remote 100) cannot be performed by the receiving device 118.

In some embodiments, haptic feedback effects may be provided to indicate selection and/or deselection of an item provided by the receiving device user interface 302 and displayed on the presentation device 120. For example, the user interface 302 may, at times, provide various messages to a user 220 that require user input. Radio buttons and/or check box features may be provided in such messages, and the user 220 may utilize the haptic feedback remote 100 to make a desired selection (such as, for example, indicating whether certain settings should be enabled or disabled) using the radio buttons and/or check box features.

In some embodiments, haptic feedback effects may be provided to distinguish, to the user 220, when a request for textual input (e.g., via user input into a text field) is needed, as opposed to input via a check box selection. The haptic feedback effects may distinguish such requests for different type of inputs by, for example, providing a particular type of haptic feedback (e.g., a particular quantity of vibrational pulses, strength or intensity of vibration, speed of vibration and/or rhythm of vibrations) associated with each of the different types of input that may be requested.

Similarly, in some embodiments, haptic feedback effects may be provided to indicate, or distinguish between, state changes of the haptic feedback remote 100 (e.g., turning the haptic feedback remote 100 on/off, indicating entry of a sleep mode, indicating that a software update is occurring, etc.).

In some embodiments, haptic feedback effects may be provided to indicate confirmation of a user's selection (e.g., confirm a selection of "cancel" or "back") and/or to confirm that the selected actions have been taken or completed (e.g., to confirm that a selection has been canceled, or to confirm that the user interface 302 has navigated "back" to a previous screen).

In some embodiments, haptic feedback effects may be provided when the receiving device 118 switches between display or presentation modes (e.g., when adjusting screen dimension settings, or switching to quarter screen (PIP) or full screen modes).

In some embodiments, haptic feedback effects may be provided to indicate that a dialog or popup message provided by the receiving device user interface 302 needs a response. For example, a message may be provided through the receiving device user interface 302 requesting user input in the form of a selection from among "yes," "no" or "cancel" options. In such a case, haptic feedback effects may be provided to indicate that a selection is required, and further may be provided to indicate a current highlighted choice from among the options (e.g., a single vibration pulse indicating "yes" is highlighted; two vibration pulses indicating "no" is highlighted; three vibration pulses indicating "cancel" is highlighted). Additionally, haptic feedback effects may be provided to confirm that a selection from among the options has been made.

It should be readily understood that haptic feedback effects may be provided to indicate numerous and varied possible conditions to a user 220 of the haptic feedback remote 100. For example, haptic feedback effects may be provided to indicate acknowledgement, by the receiving device 118, of any command issued from the haptic feedback remote 100. That is, every press of a button 112 on the haptic feedback remote 100, once received and registered as a button-press by the receiving device 118, may cause one or more haptic feedback effects to be provided, thus indicating to the user 220 that the button-press has been received by the receiving device 118. Further, the receiving device 118 may include numerous and varied functions (e.g., TV guide functions; settings; help functions; DVR functions; etc.), each of which may be associated with one or more haptic feedback effects to be provided to a user 220 of the haptic feedback remote 100.

The haptic feedback effects provided through the haptic feedback remote 100 may be thought of as a form of communication, or language, which may be used to guide or otherwise help users of the receiving device 118. As such, various forms of haptic feedback may be utilized to indicate a variety of conditions to users.

A wide variety of types or styles of haptic feedback effects (e.g., the types or styles of vibration effects) may be utilized by the haptic feedback remote 100, in order to effectively communicate to the user a variety of conditions or messages, as described above. For example, a quantity of vibrational pulses may be utilized to communicate a message or condition to a user (e.g., one quick pulse means X, two quick pulses mean Y, three quick pulses mean Z, etc.).

Various strengths or intensities of vibration may be utilized to indicate various conditions or to communicate a message to a user. For example, a weak pulse may be provided as haptic feedback to indicate confirmation by the receiving device 118 of a received, valid command from the haptic feedback remote 100 (e.g., confirming the user has selected a particular button or choice). Similarly, a strong pulse may be provided to indicate to a user that the receiving device 118 received an invalid command from the haptic feedback remote 100 (e.g., a user input that cannot be performed by the receiving device 118, an error or illogical selection, etc.).

Various speeds of vibration may be utilized to indicate various conditions or messages. The haptic feedback remote 100 may provide haptic feedback having different speeds of vibration to indicate a rate of change caused by commands received from the user. For example, a slow, steady vibration pulse may be provided to indicate a received (and performed) change of volume command or a page up/down command (e.g., the receiving device 118 receives and performs a user input causing the volume to turn up or down, or to display a page in a guide menu above or below the previous page). A fast vibration pulse may be provided to indicate the performance of an action caused by, for example, the user holding down a button (e.g., scrolling up or down through the guide menu; holding down a volume up/down button; etc.).

The haptic feedback rhythm may further be varied to indicate various conditions or messages. For example, three steady vibrational pulses in a row may indicate a first condition or message, whereas two quick vibrational pulses followed by a delayed third pulse may indicate a different condition or message. Each of the various haptic feedback parameters (i.e., quantity, intensity, duration, speed and rhythm) may be combined in various ways to provide for a wide range of communication possibilities through the haptic feedback remote 100. In some embodiments, the haptic feedback remote 100 may be configurable, such that users may set their own preferred types of haptic feedback effects for various conditions or messages.

The different types of haptic feedback effects which may be provided through the haptic feedback remote 100 may be stored, for example, in a haptic feedback effects database accessible by the haptic feedback logic 210 in the haptic feedback remote 100 and/or in a database accessible by the haptic feedback logic 230 of the receiving device 118. As such, when a condition associated with a haptic feedback effect has been detected (e.g., by the receiving device 118), a type of haptic feedback effect associated with that condition may be determined by referencing the haptic feedback effects database. Accordingly, that particular type of haptic feedback effect may be provided by the haptic feedback device 204.

Figure 4:
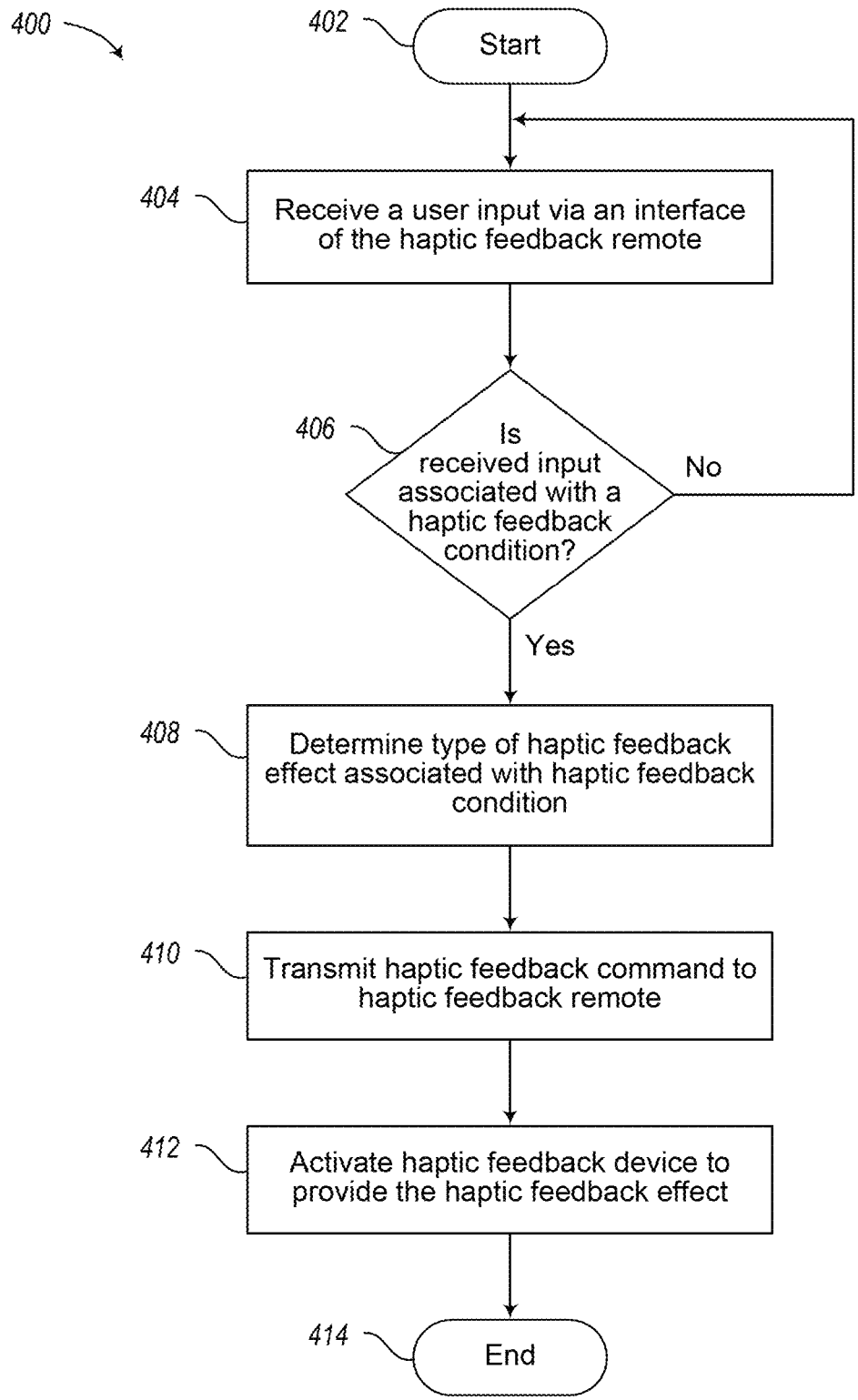
FIG. 4 is a flowchart illustrating a method for providing haptic feedback to a user of a haptic feedback remote control device, in accordance with one or more embodiments.

FIG. 4 is a flowchart illustrating a method 400 for providing haptic feedback to a user of a haptic feedback remote 100, in accordance with one or more embodiments. At block 402, the method commences. At block 404, the receiving device 118 receives a user input via an interface 114 of the haptic feedback remote 100. The user input may be provided to the receiving device 118, for example, as a command to perform some operation (e.g., turn up the volume, change a display setting, confirm a selection, etc.).

At block 406, it is determined whether the received input is associated with a haptic feedback condition. This determination may be made by the receiving device 118, for example, by accessing the haptic feedback logic 230, which may include logic and/or a database for determining whether and to what extent (e.g., what type) haptic feedback should be provided. If it is determined that the received input is not associated with a haptic feedback condition (i.e., a condition for which haptic feedback should be provided), then the flow returns to block 402 and further user input may be received at block 404. In such a case, no haptic feedback effects are provided by the haptic feedback remote 100. On the other hand, if it is determined at block 406 that the received input is associated with a haptic feedback condition, then the flow continues to block 408.

At block 408, the type of haptic feedback effect associated with the haptic feedback condition is determined, for example, by the receiving device 118. As discussed herein, a variety of types of haptic feedback effects may be provided to indicate a variety of conditions or messages. Depending on the determined haptic feedback condition (e.g., an error state, a confirmation of a selection, a scrolling speed, etc.), one of a variety of types of haptic feedback effects may be associated with the condition (e.g., effects having various quantity, intensity, duration, speed and/or rhythm characteristics).

At block 410, a haptic feedback command is transmitted from the receiving device 118 to the haptic feedback remote 100. The haptic feedback command may include, for example, a particular type of haptic feedback effect that should be provided on the haptic feedback remote 100.

At block 412, the haptic feedback device 204 of the haptic feedback remote 100 is activated, thereby providing the haptic feedback effect to a user. At block 414, the method ends; however, the receiving device 118 may be ready to begin the method again at any point in time, for example, upon receiving of another user input (e.g., at block 404).

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing haptic feedback to a user of a haptic feedback remote control device, comprising:
   providing, by a receiving device, a user interface having a plurality of selectable elements for display on a presentation device;

causing, by the receiving device, the haptic feedback remote control device to enter a haptic feedback mode, wherein in the haptic feedback mode the haptic feedback remote control device is operable to provide haptic feedback effects, wherein the causing the haptic feedback remote control device to enter a haptic feedback mode comprises:
  causing the haptic feedback remote control device to automatically enter the haptic feedback mode by the receiving device sending a haptic feedback mode entry command to the haptic feedback remote control device;
receiving, by the receiving device, an electronic command issued from the haptic feedback remote control device, the electronic command indicating a selection of one of the plurality of selectable elements;
performing, by the receiving device, an action corresponding with the indicated selection;
transmitting, by the receiving device, a haptic feedback command to the haptic feedback remote control device in response to the performing the action corresponding with the indicated selection; and
causing, by the receiving device, a haptic feedback device within the haptic feedback remote control device, to be activated based on the haptic feedback command, to provide a haptic feedback effect to a user of the haptic feedback remote control device, the haptic feedback effect indicating confirmation of the performed action corresponding with the indicated selection.

2. The method of claim 1, further comprising:
determining, by the receiving device, whether the received electronic command indicates a valid command to be performed by the receiving device,
wherein, the transmitting the haptic feedback command includes transmitting, by the receiving device, the haptic feedback command to the haptic feedback remote control device based on the receiving device determining whether a valid command is indicated.

3. The method of claim 1, further comprising:
determining, by the receiving device, a type of haptic feedback effect to be provided to the user, based on the received electronic command.

4. The method of claim 3, wherein the type of haptic feedback effect to be provided is selected from among a plurality of types of haptic feedback effects, each of the types of haptic feedback effects being distinguishable from one another based on at least one of: quantity, intensity, duration, speed and rhythm of haptic feedback.

5. The method of claim 3, wherein the determining a type of haptic feedback effect to be provided includes determining a portion of the haptic feedback remote control device to experience the haptic feedback effect.

6. The method of claim 1, wherein the haptic feedback device includes a vibration device.

7. The method of claim 1, wherein the causing the haptic feedback remote control device to enter a haptic feedback mode comprises:
receiving, by the receiving device, a haptic feedback mode entry command signal from the haptic feedback remote control device.

8. A haptic feedback system, comprising:
a receiving device configured to provide a user interface having a plurality of selectable elements for display on a presentation device; and
a haptic feedback remote control device including a haptic feedback device, the haptic feedback remote control device being configured to:
  transmit an electronic command to the receiving device, the electronic command indicating a selection of one of the plurality of selectable elements,
  receive a haptic feedback command from the receiving device in response to the receiving device performing an action corresponding with the indicated selection, and
  activate, based on the received haptic feedback command, the haptic feedback device to provide a haptic feedback effect to a user of the haptic feedback remote control device, the haptic feedback effect indicating confirmation of the performed action corresponding with the indicated selection, wherein the receiving device is configured to transmit a haptic feedback mode entry command to the haptic feedback remote control device, and the haptic feedback remote control device is configured to enter a haptic feedback mode upon receipt of the haptic feedback mode entry command, wherein in the haptic feedback mode the haptic feedback remote control device is operable to provide haptic feedback effects.

9. The haptic feedback system of claim 8, wherein the receiving device is configured to:
receive the transmitted electronic command indicating the selection of one of the plurality of selectable elements;
determine whether the received electronic command indicates a valid command to be performed by the receiving device; and
transmit a haptic feedback command to the haptic feedback remote control device based on the receiving device determining whether a valid command is indicated.

10. The haptic feedback system of claim 8, wherein the receiving device is configured to:
receive the transmitted electronic command; and
determine a type of haptic feedback effect to be provided to the user, based on the received electronic command.

11. The haptic feedback system of claim 10, wherein the type of haptic feedback effect to be provided is selected from among a plurality of types of haptic feedback effects, each of the types of haptic feedback effects being distinguishable from one another based on at least one of: quantity, intensity, duration, speed and rhythm of haptic feedback.

12. The haptic feedback system of claim 10, wherein the receiving device is further configured to determine a portion of the haptic feedback remote control device to experience the haptic feedback effect.

13. The haptic feedback system of claim 8, wherein the haptic feedback device includes a vibration device.

14. The haptic feedback system of claim 8, wherein the haptic feedback remote control device includes a haptic feedback mode enable/disable input element, the haptic feedback mode enable/disable input element being operable to selectively enter the haptic feedback remote control device into a haptic feedback mode, wherein in the haptic feedback mode the haptic feedback remote control device is operable to provide haptic feedback effects.

15. A haptic feedback remote control device, comprising:
haptic feedback logic;
a haptic feedback device; and
a processor coupled to the haptic feedback logic and the haptic feedback device, the haptic feedback remote control device being configured to:
  receive a haptic feedback mode entry command from a receiving device, wherein the receiving the haptic feedback mode entry command from the receiving device causes the haptic feedback remote control device to automatically enter the haptic feedback mode by the receiving device, wherein in the haptic feedback mode the haptic feedback remote control device is operable to provide haptic feedback effects;

transmit an electronic command to the receiving device, the electronic command indicating a selection of one of a plurality of selectable elements of a user interface, provided by the receiving device, and having a plurality of selectable elements for display on a presentation device, receive a haptic feedback command from the receiving device in response to the receiving device performing an action corresponding with the indicated selection, and activate, based on the received haptic feedback command, the haptic feedback device to provide a haptic feedback effect to a user of the haptic feedback remote control device, the haptic feedback effect indicating confirmation of the performed action corresponding with the indicated selection.

16. The haptic feedback remote control device of claim 15, further comprising:

a haptic feedback mode enable/disable input element, the haptic feedback mode enable/disable input element being operable to selectively enter the haptic feedback remote control device into the haptic feedback mode.

17. A haptic feedback system, comprising:

a receiving device configured to provide a user interface having a plurality of selectable elements for display on a presentation device;

a haptic feedback remote control device configured to transmit an electronic command to the receiving device, the electronic command indicating a selection of one of the plurality of selectable elements; and haptic feedback means, coupled with the haptic feedback remote control device, for providing a haptic feedback effect to a user of the haptic feedback remote control device, based on a haptic feedback command received from the receiving device in response to the receiving device performing an action corresponding with the indicated selection, the haptic feedback effect indicating confirmation of the performed action corresponding with the indicated selection, wherein the receiving device is configured to transmit a haptic feedback mode entry command to the haptic feedback remote control device, and the haptic feedback remote control device is configured to enter a haptic feedback mode upon receipt of the haptic feedback mode entry command, wherein in the haptic feedback mode the haptic feedback remote control device is operable to provide haptic feedback effects.

* * * * *